(12) United States Patent
Dionne

(10) Patent No.: US 10,967,983 B2
(45) Date of Patent: Apr. 6, 2021

(54) AIRCRAFT POWER PLANT

(71) Applicant: PRATT & WHITNEY CANADA CORP., Longueuil (CA)

(72) Inventor: Luc Dionne, Candiac (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 100 days.

(21) Appl. No.: 16/432,118

(22) Filed: Jun. 5, 2019

(65) Prior Publication Data

US 2020/0385138 A1   Dec. 10, 2020

(51) Int. Cl.
| | |
|---|---|
| *B64D 33/08* | (2006.01) |
| *F02M 35/10* | (2006.01) |
| *B64D 41/00* | (2006.01) |
| *B64D 27/02* | (2006.01) |
| *F01P 7/02* | (2006.01) |
| *F02B 53/14* | (2006.01) |

(Continued)

(52) U.S. Cl.
CPC ............. *B64D 33/08* (2013.01); *B64D 27/02* (2013.01); *B64D 41/00* (2013.01); *F01P 5/06* (2013.01); *F01P 7/02* (2013.01); *F01P 7/023* (2013.01); *F02B 53/14* (2013.01); *F02M 35/024* (2013.01); *F02M 35/10203* (2013.01); *F02M 35/10262* (2013.01); *F01P 2003/022* (2013.01); *F02B 2053/005* (2013.01)

(58) Field of Classification Search
CPC ....... F02M 35/10262; F02M 35/10203; F02M 35/024; B64D 33/08; B64D 41/00; F02B 53/14; F02B 2053/005; F01P 2003/022; F01P 5/06; F01P 7/023; F01P 7/02; F02F 1/04

USPC ...... 244/53 B; 123/41.56, 41.57, 41.7, 41.62
See application file for complete search history.

(56) References Cited

U.S. PATENT DOCUMENTS 1,906,404 A * 5/1933 Page, Jr. ................ B64D 33/08
                                                         123/196 AB
5,265,408 A    11/1993 Sheoran et al.
(Continued)

FOREIGN PATENT DOCUMENTS

| EP | 3127814 A1 | 2/2017 |
|---|---|---|
| EP | 3396148 A1 | 10/2018 |

OTHER PUBLICATIONS

European Search Report issued in counterpart EP application No. 20178604.3 dated Oct. 30, 2020.

*Primary Examiner* — Syed O Hasan
(74) *Attorney, Agent, or Firm* — Norton Rose Fulbright Canada LLP

(57) ABSTRACT

There is disclosed a cooling system for a liquid cooled internal combustion power plant housed in an engine compartment in a tail cone of an aircraft. The cooling system has: a tail cone inlet defined through a wall of the tail cone and fluidly communicating with an environment; a wall inlet defined through a firewall of the engine compartment; a blower within the engine compartment and having a blower inlet and a blower outlet, the blower inlet fluidly communicating with the environment via the tail cone inlet, via the wall inlet, and via an interior of the engine compartment; a blower outlet defined through a wall of the aircraft and fluidly communicating with the environment; and a cooling flow path extending from the tail cone inlet to the air outlet and across the wall inlet, the cooling flow path in heat exchange relationship with the power plant.

15 Claims, 5 Drawing Sheets

(51) Int. Cl.
    *F01P 5/06*     (2006.01)
    *F02M 35/024*     (2006.01)
    *F02B 53/00*     (2006.01)
    *F01P 3/02*     (2006.01)

(56) References Cited

U.S. PATENT DOCUMENTS

| | | | |
|---|---|---|---|
| 6,092,360 | A | 7/2000 | Hoag et al. |
| 7,857,257 | B2 * | 12/2010 | Schwarz ............... F02C 7/042 |
| | | | 244/53 B |
| 8,322,981 | B2 | 12/2012 | Light et al. |
| 8,621,842 | B2 | 1/2014 | Francisco et al. |
| 8,794,571 | B2 | 8/2014 | Baumgardt et al. |
| 9,644,538 | B2 | 5/2017 | Dionne |
| 2006/0163425 | A1 * | 7/2006 | Brown .................. F02C 7/045 |
| | | | 244/53 B |
| 2017/0036775 | A1 | 2/2017 | Jones et al. |
| 2017/0267341 | A1 | 9/2017 | Thomassin |
| 2018/0106225 | A1 * | 4/2018 | Dionne ................. B64D 33/02 |
| 2020/0108915 | A1 | 4/2020 | Thomassin et al. |

* cited by examiner

FIG_1

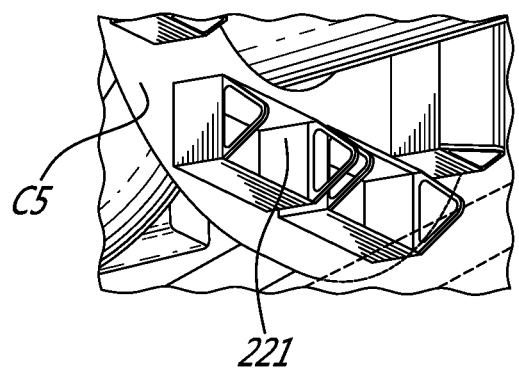
FIG_8
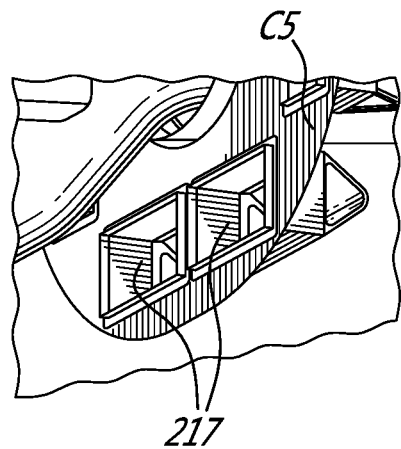
FIG_9
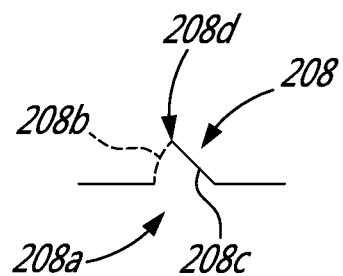
FIG_10

AIRCRAFT POWER PLANT

TECHNICAL FIELD

The application relates generally to aircraft power plants and, more particularly, to systems and methods for supplying air to be used by such power plants.

BACKGROUND OF THE ART

An aircraft power plant, such as an auxiliary power unit (APU), is usually contained within an engine compartment defined by an aircraft. In some cases, either a liquid coolant and/or a lubricant of the power plant needs to be cooled.

SUMMARY

In one aspect, there is provided a cooling system for a liquid cooled internal combustion power plant housed in an engine compartment in a tail cone of an aircraft, the cooling system comprising: a compartment cooling air inlet path defined from an environment outside the aircraft through a tail cone inlet and through a compartment firewall inlet to feed compartment air of the compartment; a blower disposed in the compartment having an inlet communicating with the compartment air for drawing compartment air into the blower; a heat exchanger receiving the blower cooling air and configured to, in use, cool an engine liquid coolant circulating through the heat exchanger.

In another aspect, there is provided a cooling system for a liquid cooled internal combustion power plant housed in an engine compartment in a tail cone of an aircraft, the cooling system comprising: a tail cone inlet defined through a wall of the tail cone and fluidly communicating with an environment outside the aircraft; a wall inlet defined through a firewall of the engine compartment; a blower within the engine compartment and having a blower inlet and a blower outlet, the blower inlet fluidly communicating with the environment via the tail cone inlet, via the wall inlet, and via an interior of the engine compartment; a blower outlet defined through a wall of the aircraft and fluidly communicating with the environment; and a cooling flow path extending from the tail cone inlet to the air outlet and across the wall inlet, the cooling flow path in heat exchange relationship with the liquid cooled internal combustion power plant.

In yet another aspect, there is provided an aircraft power plant configured to be located within an engine compartment of a tail cone of an aircraft, comprising: an intermittent internal combustion engine; a tail cone inlet defined through a wall of the tail cone and fluidly connected to an environment outside the aircraft; a wall inlet defined through a firewall of the engine compartment; a blower within the engine compartment and having a blower inlet and a blower outlet, the blower inlet fluidly connected to the environment via the tail cone inlet, via the wall inlet, and via an interior of the engine compartment; an outlet defined through a wall of the aircraft and fluidly connecting the blower outlet to the environment; and a cooling flow path extending from the tail cone inlet to the air outlet and across the wall inlet, the cooling flow path in heat exchange relationship with the intermittent internal combustion engine.

In still yet another aspect, there is provided a method of operating a cooling system for a liquid cooled internal combustion aircraft power plant located within an engine compartment of a tail cone of an aircraft, comprising: driving a rotatable load with the liquid cooled internal combustion aircraft power plant; decreasing a pressure within the engine compartment relative to a pressure in the environment with a blower to draw cooling air from the environment into the engine compartment via a tail cone inlet and through a firewall of the engine compartment; and cooling the liquid cooled internal combustion aircraft power plant using the cooling air.

DESCRIPTION OF THE DRAWINGS

Reference is now made to the accompanying figures in which:

FIG. 8 is a schematic rear three-dimensional view of a firewall accordance with one embodiment;

FIG. 9 is a schematic front three-dimensional view of the firewall of FIG. 8; and FIG. 10 is a cross-sectional view of a louver in accordance with one embodiment that may be used as an inlet on the tail of the aircraft.

DETAILED DESCRIPTION

Figure 1:
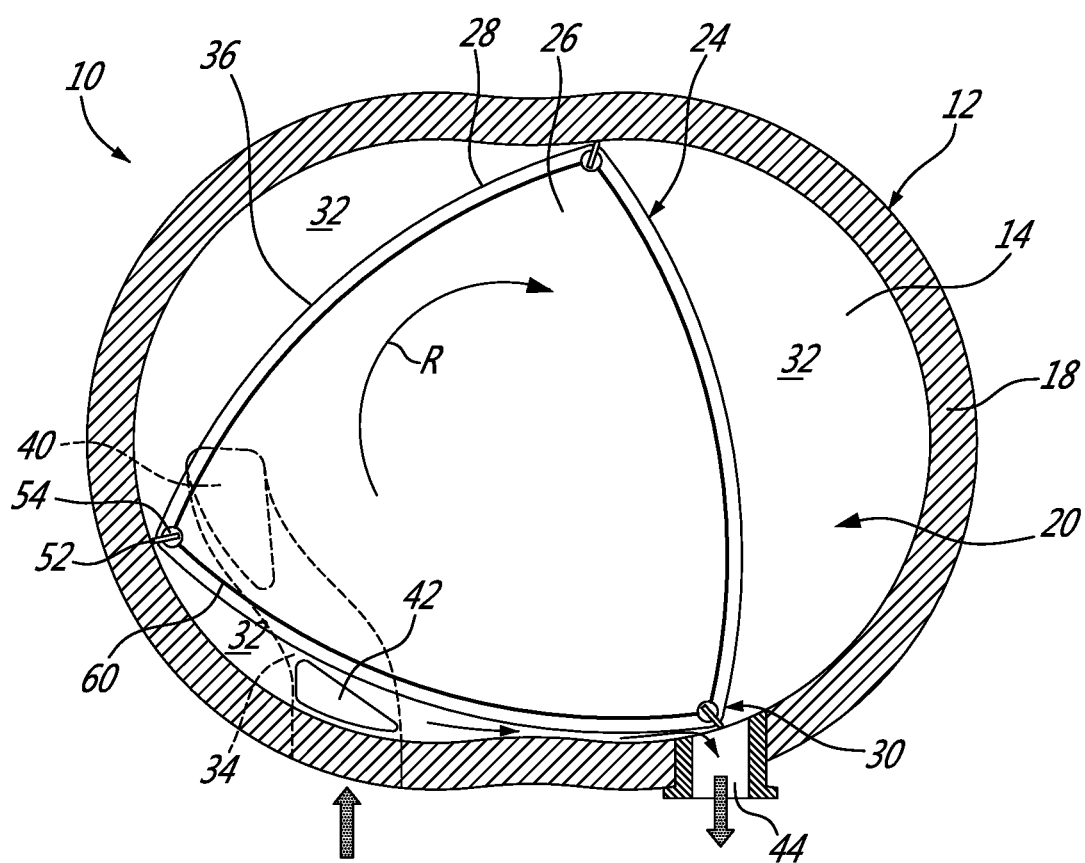
FIG. 1 is a schematic cross-sectional view of a rotary internal combustion engine in accordance with a particular embodiment.

Referring to FIG. 1, a rotary internal combustion engine 10 known as a Wankel engine is schematically shown. The rotary engine 10 comprises an outer body 12 having axially-spaced end walls 14 with a peripheral wall 18 extending therebetween to form a rotor cavity 20. The inner surface of the peripheral wall 18 of the cavity 20 has a profile defining two lobes, which is preferably an epitrochoid.

In a particular embodiment, the outer body 12 is made of aluminum. Aluminum might be advantageous for aircraft applications as it is less dense then steel. However, aluminum has a coefficient of thermal conductivity greater than that of the steel and has a melting point lower than that of the steel. Proper cooling might be required when using an internal combustion engine having a body made of aluminum. More detail about this are presented herein below.

An inner body or rotor 24 is received within the cavity 20. The rotor 24 has axially spaced end faces 26 adjacent to the outer body end walls 14, and a peripheral face 28 extending therebetween. The peripheral face 28 defines three circumferentially-spaced apex portions 30, and a generally triangular profile with outwardly arched sides 36. The apex portions 30 are in sealing engagement with the inner surface of peripheral wall 18 to form three rotating combustion chambers 32 between the inner rotor 24 and outer body 12. The geometrical axis of the rotor 24 is offset from and parallel to the axis of the outer body 12.

The combustion chambers 32 are sealed. In the embodiment shown, each rotor apex portion 30 has an apex seal 52 extending from one end face 26 to the other and biased radially outwardly against the peripheral wall 18. An end seal 54 engages each end of each apex seal 52 and is biased against the respective end wall 14. Each end face 26 of the rotor 24 has at least one arc-shaped face seal 60 running from each apex portion 30 to each adjacent apex portion 30, adjacent to but inwardly of the rotor periphery throughout its length, in sealing engagement with the end seal 54 adjacent each end thereof and biased into sealing engagement with the adjacent end wall 14. Alternate sealing arrangements are also possible.

Although not shown in the Figures, the rotor 24 is journaled on an eccentric portion of a shaft such that the shaft rotates the rotor 24 to perform orbital revolutions within the stator cavity 20. The shaft rotates three times for each complete rotation of the rotor 24 as it moves around the stator cavity 20. Oil seals are provided around the eccentric to impede leakage flow of lubricating oil radially outwardly thereof between the respective rotor end face 26 and outer body end wall 14. During each rotation of the rotor 24, each chamber 32 varies in volumes and moves around the stator cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air, an exhaust port 44, and an optional purge port 42 also in communication with the source of air (e.g. a compressor) and located between the inlet and exhaust ports 40, 44. The ports 40, 42, 44 may be defined in the end wall 14 of in the peripheral wall 18. In the embodiment shown, the inlet port 40 and purge port 42 are defined in the end wall 14 and communicate with a same intake duct 34 defined as a channel in the end wall 14, and the exhaust port 44 is defined through the peripheral wall 18. Alternate configurations are possible.

In a particular embodiment, fuel such as kerosene (jet fuel) or other suitable fuel is delivered into the chamber 32 through a fuel port (not shown) such that the chamber 32 is stratified with a rich fuel-air mixture near the ignition source and a leaner mixture elsewhere, and the fuel-air mixture may be ignited within the housing using any suitable ignition system known in the art (e.g. spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 44.

Figure 2:
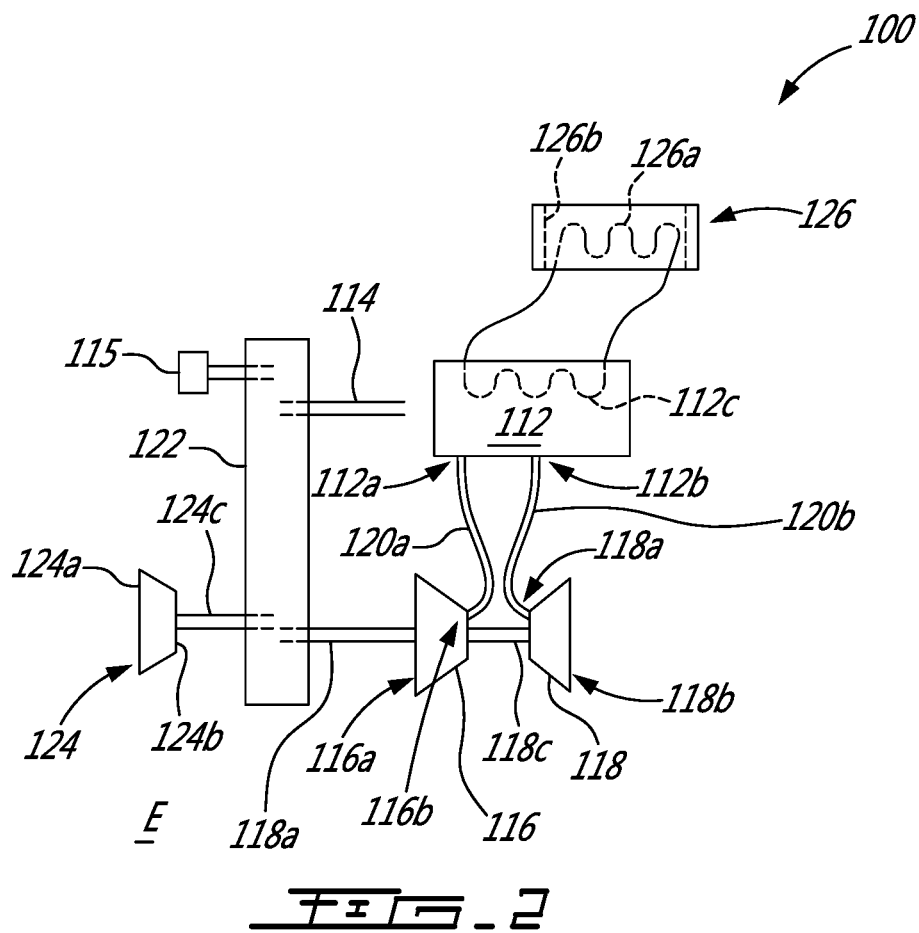
FIG. 2 is a schematic view of an engine assembly in accordance with one embodiment.

Referring to FIG. 2, an engine assembly 100 is generally shown and includes an internal combustion engine 112. In a particular embodiment, the internal combustion engine 112 comprises one or more rotary units each configured for example as a Wankel engine, or one or more reciprocating pistons. The internal combustion engine 112 may be the rotary internal combustion engine 10 described herein above with reference to FIG. 1. Any other suitable intermittent internal combustion engine, such as a piston engine, may be used without departing from the scope of the present disclosure.

The internal combustion engine 112 drives a shaft 114 that is used for driving a rotatable load 115. It is understood that the rotatable load 115 may be any appropriate type of load, including, but not limited to, one or more generator(s), propeller(s), accessory(ies), rotor mast(s), compressor(s), or any other appropriate type of load or combination thereof. In a particular embodiment, the internal combustion engine 112 is a rotary engine comprising three rotary units each configured as a Wankel engine, with a rotor cavity having a profile defining two lobes, preferably an epitrochoid, in which a rotor is received with the geometrical axis of the rotor being offset from and parallel to the axis of the rotor cavity, and with the rotor having three circumferentially-spaced apex portions and a generally triangular profile with outwardly arched sides, so as to define three rotating combustion chambers with variable volume.

In a particular embodiment, the engine assembly 100 is a compound cycle engine system or compound cycle engine such as described in Lents et al.'s U.S. Pat. No. 7,753,036 issued Jul. 13, 2010 or as described in Julien et al.'s U.S. Pat. No. 7,775,044 issued Aug. 17, 2010, or as described in Thomassin et al.'s U.S. patent publication No. 2015/0275749 published Oct. 1, 2015, or as described in Bolduc et al.'s U.S. patent publication No. 2015/0275756 published Oct. 1, 2015, the entire contents of all of which are incorporated by reference herein. The engine assembly 10 may be used as a prime mover engine, such as on an aircraft or other vehicle, or in any other suitable application. The engine assembly 10 may include a turboprop or a turboshaft instead of the internal combustion engine.

In the embodiment shown, the engine assembly 100 includes a compressor 116 for compressing the air before it is fed to an air inlet 112a of the internal combustion engine 112 and a turbine section 118 receiving the exhaust gases from the internal combustion engine 112. It is understood that variations are possible, and that, for example, the compressor 116 and/or turbine section 118 may be omitted.

The compressor has a compressor inlet 116a fluidly connectable to an environment E outside the engine assembly, also referred to herein as a source of ambient air, and a compressor outlet 116b fluidly connected to the air inlet 112a of the internal combustion engine 112 via a conduit 120a. The turbine section 118 includes a turbine inlet 118a fluidly connected to an exhaust 112b of the internal combustion engine 112 via a conduit 120b and a turbine outlet 118b fluidly connected to the environment E for expelling the exhaust gases generated by the internal combustion engine 112.

The internal combustion engine 112 provides an exhaust flow of high pressure hot gas exiting at high peak velocity, in the form of exhaust pulses. In the illustrated embodiment, the exhaust 112b of the internal combustion engine 112 (corresponding to or communicating with an exhaust port of a respective rotary engines/reciprocating pistons of the internal combustion engine 112) is in fluid communication with the turbine inlet 118a of the turbine section 118. Accordingly, the exhaust flow from the internal combustion engine 112 is supplied to the turbine section 118. The turbine section 118 may comprise a single turbine, or two or more turbine stages in serial fluid communication; the two or more turbine stages may have different reaction ratios from one another. Other configurations are contemplated.

In the illustrated embodiment, the internal combustion engine 112, the compressor 116, the rotatable load 115, and the turbine section 118 are in driving engagement with a gearbox 122. The gearbox 122 is configured to allow the turbine section 118 to compound power with the engine shaft 114 and to allow the turbine section 118 and/or the internal combustion engine 112 to drive the compressor 116 and/or the rotatable load 115. In the embodiment shown, the rotatable load 115 is in driving engagement with the engine shaft 114 and/or a turbine shaft 118c via the gearbox 122.

In the illustrated embodiment, the compressor 116 and the turbine section 118 are in a driving engagement with the gearbox 122. In the illustrated embodiment, the compressor and turbine rotors are engaged to the turbine shaft 118c which is drivingly engaged to the engine shaft 114 through the gearbox 120; the turbine shaft 118c and the engine shaft 114 are parallel and radially offset from one another. Alternate configurations are possible, including, but not limited to, the rotor(s) of the compressor 116 being engaged to a shaft separate from the turbine shaft 118c (whether coaxial with the turbine shaft 118c, with the engine shaft 114, or offset from both) and in driving engagement with the turbine shaft 118c and/or the engine shaft 114, for example through the gearbox 120; and/or two or more of the shafts 118a, 114 extending at an angle (perpendicularly or otherwise) to each other.

In the embodiment shown, the engine assembly 100 further includes a load compressor 124 configured for providing compressed air to a pneumatic system of an aircraft containing the engine assembly 100. The load compressor 124 has a load compressor inlet 124a fluidly connected to the environment E and a load compressor outlet 124b fluidly connected to the pneumatic system.

The load compressor 124 includes at least one rotor rotating with a load compressor shaft 124c. The shaft 124c of the load compressor 124 is, in the depicted embodiment, in driving engagement with the engine shaft 114 and/or with the turbine shaft 118c via the gearbox 122. The shaft 124c of the load compressor 124 and the turbine shaft 118c may be monolithic. The load compressor shaft 124c of the load compressor 124 may be coaxial with the turbine shaft 118c.

Still referring to FIG. 2, the internal combustion engine 112 is liquid cooled and includes a coolant circuitry 112c configured for circulating a liquid coolant. The engine assembly 100 includes a heat exchanger 126 for expelling heat from the liquid coolant to the environment E. The heat exchanger 126 includes at least one first conduit 126a and at least one second conduit 126b in heat exchange relationship with the at least one first conduit 126a. The at least one first conduit 126a is fluidly connected to the coolant circuitry 112c of the internal combustion engine 112. The at least one second conduit 126b is fluidly connected to the environment E for receiving a flow of cooling air from the environment E.

The heat exchanger 126 may be used for providing heat exchange relationship between a lubricant circuit of the engine 112 and the air for cooling lubricant circulating within the lubricant circuit. The lubricant may be used, for instance, for lubricating bearings. In a rotary internal combustion engine, the lubricant is used for lubricating the faces of the rotor 24 and for cooling down sealing faces of the rotor 24. The engine assembly 100 may include more than one heat exchanger each configured for transferring heat from a respective one of fluids (e.g., lubricant, liquid coolant) used by the engine to the environment E.

In use, heat generated by the combustion of fuel within combustion chambers of the internal combustion engine 112 is dissipated within a casing, or body, of the internal combustion engine 112. The heat is then transmitted from the body to the liquid coolant circulating within the coolant circuitry 112c before being transmitted from the liquid coolant to the flow of cooling air from the environment E via the heat exchange relationship between the at least one first conduit 126a and at least one second conduit 126b of the heat exchanger 126.

Figure 3:
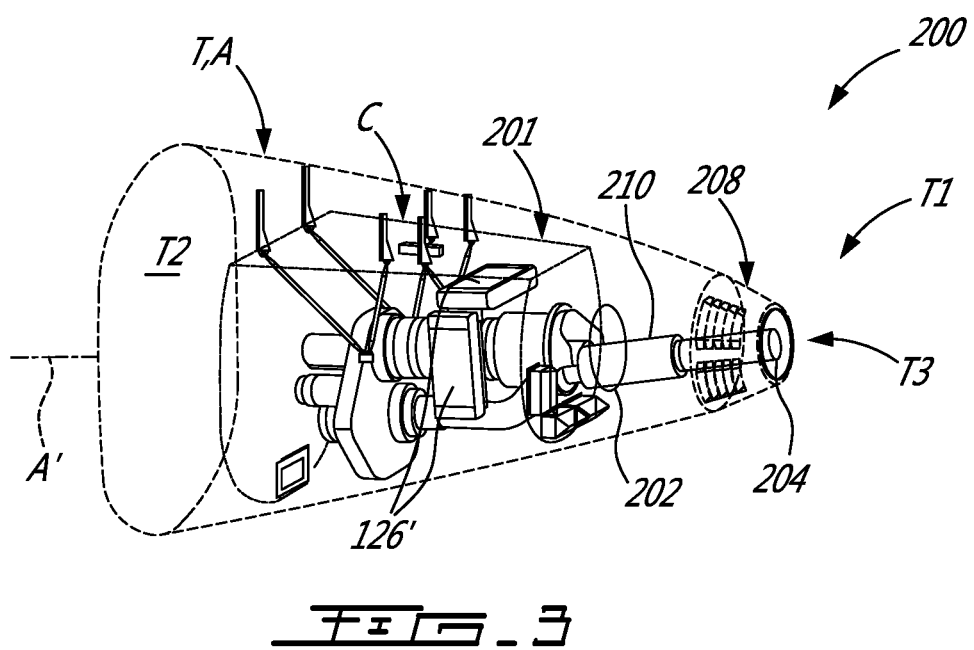
FIG. 3 is a schematic three dimensional partially transparent view of an aircraft power plant in accordance with one embodiment contained within an engine compartment located within a tail section of an aircraft.
Figure 4:
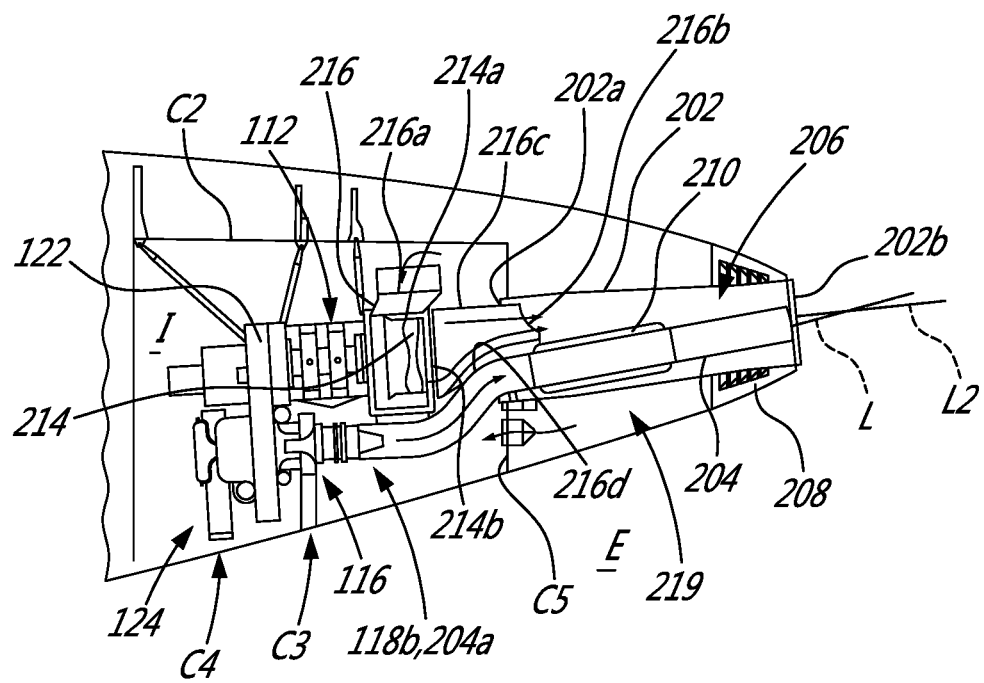
FIG. 4 is a schematic cross-sectional view of the aircraft power plant of FIG. 3.

Referring now to FIGS. 3-4, an aircraft power plant 200, which may include the engine assembly 100 of FIG. 2, is shown installed within an engine compartment C located inside a tail section T of an aircraft A. The power plant 200 may be an auxiliary power unit (APU). The tail section T ends at an apex T1. The tail section T may correspond to a portion of the aircraft where a cross-sectional area of the aircraft A decreases along an aircraft axis A' of the aircraft intersecting the apex T1. In other words, a wall T2 of the tail section T converges toward the apex T1. The apex T1 may correspond to a rear-most location of a fuselage of the aircraft A.

In a particular embodiment, the aircraft power plant 200 needs air for proper operation. Internal combustion engines usually have a higher cooling requirement than a gas turbine engine for the same power. Moreover, and as aforementioned, the body of the internal combustion engine 112 may be made entirely of, or partially from, aluminum. The use of such a material may be beneficial from an aircraft performance point of view as it is lighter than steel. However, its melting point is lower than steel. Proper cooling of the body of such an engine, especially when made of aluminum, might be required.

In this regard, the power plant 200 includes a cooling system 201. The air may be used for cooling the internal combustion engine 112, for feeding air to the air inlet 112a of the internal combustion engine 112, for feeding air to the load compressor 124, and/or any other suitable use of air that might be required for operation of the aircraft A and/or of the power plant 200.

In the embodiment shown, the power plant 200 includes an air outlet pipe 202, also referred to as a shroud conduit, or an air outlet conduit. The air outlet pipe 202 has a pipe inlet 202a fluidly connected to an interior I of the engine compartment C and an a pipe outlet 202b fluidly connected to the environment E outside the engine compartment C. The air outlet pipe 202 extends along a longitudinal axis L.

In the embodiment shown, the air outlet pipe 202 is fluidly connected to the environment E via an outlet T3 defined through the wall T2 of the tail cone T. In the embodiment shown, the air outlet pipe 202 protrudes beyond the outlet T3 of the wall T2 of the tail cone T. In the embodiment shown, the outlet T3 through the tail cone wall T2 is located at the apex T1 of the tail cone T. The air outlet pipe 202 is fluidly connected to the environment via the tail cone outlet T3.

The power plant 200 includes an exhaust pipe 204 that is fluidly connected to the turbine outlet 118b of the turbine section 118 and configured for expelling the exhaust gases in the environment E.

In the embodiment shown, the exhaust pipe 204 is located within the air outlet pipe 202. In other words, the air outlet pipe 202 surrounds the exhaust pipe 204. In a particular embodiment, the exhaust pipe 204 and the air outlet pipe 202 are concentric and their respective longitudinal axes are coincident. In the embodiment shown, the longitudinal axis L of the exhaust pipe 204 intersects at an angle a longitudinal axis L2 of the air outlet pipe 202. Such an angle may allow maximizing a volume available at the inlet 202a of the air outlet conduit 202 to facilitate the introduction of the cooling fan discharge airflow. An annulus 206 is defined radially between the exhaust pipe 204 and the air outlet pipe 202 relative to the longitudinal axis L. The annulus 206 is fluidly connected to the environment E.

Figure 5:
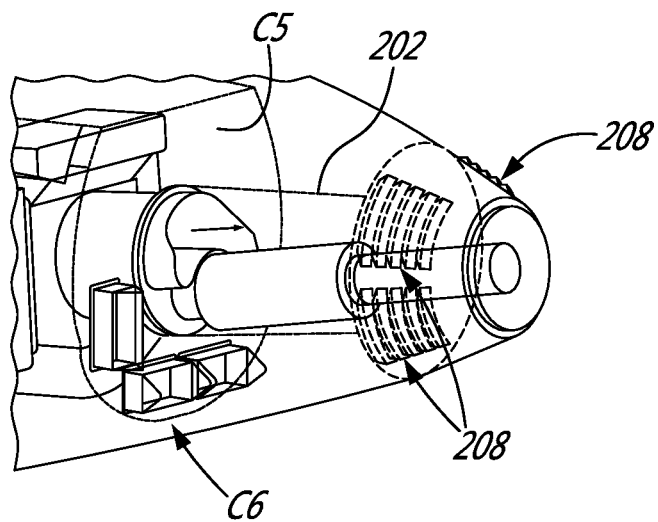
FIG. 5 is a schematic rear three dimensional view of the aircraft power plant of FIG. 3.

Referring more particularly to FIG. 5, one of the walls C2 of the engine compartment C is a firewall C5. The firewall C5 may be a rear-most wall of the engine compartment C and may extend substantially radially relative to the aircraft axis A'. In other words, the firewall C5 is substantially transversal relative to the wall T2 of the tail cone T. The firewall C5 defines an air inlet C6, also referred to as a wall inlet, that may be one or more apertures defined through the firewall C5. The firewall C5 is used to prevent a fire to propagate from the engine compartment C that is considered as a fire zone to the rear section of the tail cone T, ending at the apex T1, which is not a fire zone. In the embodiment shown, the air inlet C5 includes four rectangular apertures circumferentially distributed around the aircraft axis A' and located on a bottom half of the firewall C5. The firewall C5 includes a main opening for receiving the air outlet pipe 202 and for connecting the air outlet pipe 202 with the engine compartment C. Other configurations are contemplated.

Referring to FIGS. 8-9, flame arrestors 217 are disposed over the air inlet C6 of the firewall C5 to prevent fire to propagate from an engine compartment side of the fire wall C5 to the other side. Any suitable flame arrestor, such as honeycomb core flame arrestor, may be used. Air filters 221 may be disposed over the air inlet C6 of the firewall C5 to filter (e.g., remove pollutants, particles) from the air before it is fed in the engine compartment C. Alternatively, the filters may be located directly at the inlet of the compressors 116, 124. As illustrated, the air inlet C6 includes a plurality of openings, but only one bigger opening may be used as long as the structural integrity of the firewall C5 is not compromised.

Referring back to FIGS. 4-5, a plenum 219 is defined radially between the wall T2 of the tail cone T and the air outlet conduit 202 relative to the aircraft axis A' and axially between the firewall C5 and the apex T1 of the tail cone T. The plenum 219 surrounds the air outlet pipe 202. The plenum 219 is fluidly connected to the environment E outside the aircraft A via louvers 208 defined proximate the apex T1 of the tail cone T. More detail about the louvers are provided below.

Figure 6:
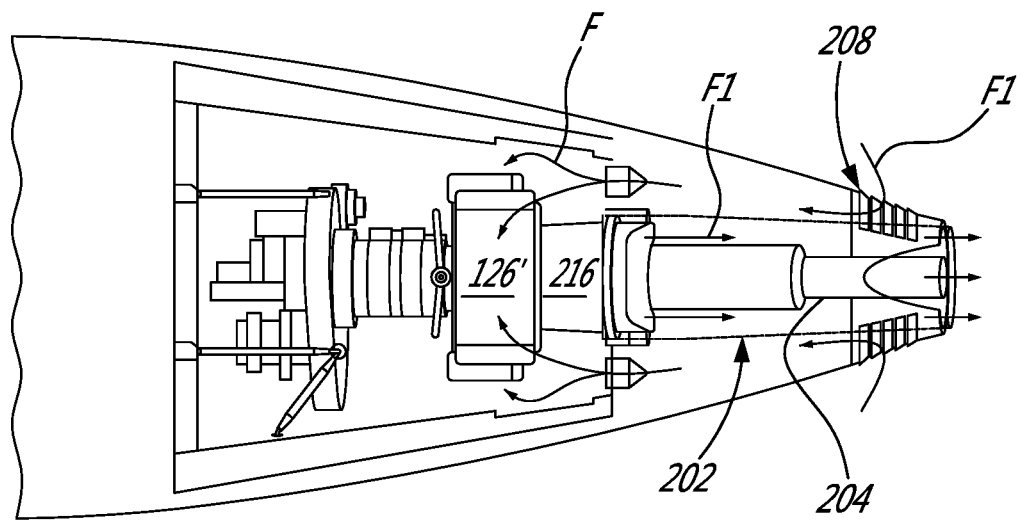
FIG. 6 is a schematic top partially transparent view of the aircraft power plant of FIG. 3.

Referring more particularly to FIG. 6, the air from the environment E penetrates the plenum 219 via the louvers 208 and is directed within the plenum 219 to the engine compartment C via the air inlet C6 defined through the firewall C5. The air then circulates through the heat exchanger 126 where it picks up heat from the liquid coolant circulating within the coolant circuitry 112c (FIG. 2) of the internal combustion engine 112. In other words, the at least one second conduit 126b (FIG. 2) of the heat exchanger 126 is fluidly connected to the plenum 219. The air that has been heated via its passage through the at least one second conduit 126b of the heat exchangers 126 by picking up heat from the liquid coolant is expelled back to the environment E via the annulus 206 defined between the air outlet conduit 202 and the exhaust duct 204. In the embodiment shown, the air that has been heated via its passage through the heat exchanger 126 is ejected to the environment E in the form of an annular flow circumferentially extending around the exhaust gases expelled from the internal combustion engine 112 via the exhaust duct 204.

In other words, a cooling flow F circulates along a cooling flow path F1 that extends from the louvers 208 across the plenum 219, through the air inlet C6 defined through the firewall C5 of the engine compartment C, within the interior I of the engine compartment C, through the blower 214, through the shroud duct 202, and through the pipe outlet 202b and tail cone outlet T3 that connects the shroud duct 202 to the environment E. The cooling flow path F1 is in heat exchange relationship with the engine 112. In the embodiment shown, the cooling flow path F1 extends through the at least one second conduit 126b of the heat exchanger 126. The cooling flow path F1 may be in heat exchange relationship with other components of the power plant 200. The blower inlet 214a is fluidly connected to the environment E via the interior I of the engine compartment C.

In an alternate embodiment, the air outlet pipe 202 may be radially offset from the exhaust pipe 204 relative to the longitudinal axis L of the exhaust pipe 204. In other words, the exhaust pipe 204 need not extend within the air outlet pipe 202. In the configuration where the exhaust pipe 204 is not within the air outlet pipe 202, a thermal blanket may be disposed over an external surface of the exhaust pipe 204 to avoid heat of the exhaust gases from heating the cooling air circulating in the plenum 219 before it reaches the heat exchanger 126.

Referring back to FIG. 4, in the embodiment shown, air for the combustion of the fuel within the combustion chambers of the internal combustion engine 112 enters the compressor inlet 116a (FIG. 2) via an air inlet C3 defined through the walls T2, C2 of the tail section T and of the engine compartment C. A filter may be disposed over the air inlet C3 so that air is filtered before reaching the compressor inlet 116a.

The load compressor 124 may have its inlet 124a fluidly connected to the environment E via a second air inlet C4 defined through the walls T2, C2 of the tail section T and of the engine compartment C. A filter may be disposed over the second air inlet C4 so that air is filtered before reaching the inlet 124a of the load compressor 124. The air inlet C3 for the compressor 116 and the second air inlet C4 of the load compressor may be independent from each other. In the depicted embodiment, the air inlet C3 of the compressor 116 is fluidly connected to the environment E independently of the plenum 219. In other words, the air that circulates through the plenum 219 toward the engine compartment C might not be used to feed air to the air inlet 112a of the internal combustion engine 112. Alternatively, air provided to the air inlet 112a (FIG. 2) of the internal combustion engine 112 may be drawn from the engine compartment C.

In the embodiment shown, the air that enters the engine compartment C via the plenum 219 may be used for two purposes: cooling the internal combustion engine 112 and exchanging the air contained within the engine compartment C to avoid fuel emanation to accumulate therein. In the embodiment shown, air from the environment E enters the engine compartment C solely via the plenum 219 and the air inlet C6 defined through the firewall C5.

As discussed herein above with reference to FIG. 2, the compressed air is fed to the internal combustion engine 112 and the exhaust gases generated by the engine 112 are fed to the turbine section 118 for being outputted to the environment E via the exhaust pipe 204. An acoustic attenuator, or muffler, 210 may be fluidly connected to the exhaust pipe 204 for decreasing noise generated by the engine 112. The acoustic attenuator 210 may be located within the tail section T of the aircraft C. In the embodiment shown, the acoustic attenuator 210 is located at least partially within the annulus 206 between the exhaust pipe 204 and the air outlet pipe 202.

In this view, thermal blankets may be disposed on an external face of the air outlet pipe 202 and within the plenum 219 for decreasing an amount of heat transferred from the exhaust gases circulating within the exhaust pipe 204 to the air circulating within the plenum 219 via the air in the annulus 206. As the air circulating in the plenum 219 may be used for cooling the internal combustion engine 112, it might be preferred to feed air as cool as possible to the heat exchangers 126. The thermal blankets might help in keeping a temperature of the air reaching the engine compartment C as close as possible as a temperature of the air within the environment E. Stated differently, the thermal blankets might decrease a temperature increase of the air within the plenum 219 compared to a configuration lacking such thermal blankets.

Referring more particularly to FIG. 4, the power plant 200 includes a blower 214 used for drawing air from the environment E in the engine compartment C via the plenum 219. The blower 214 has a blower inlet 214a fluidly connected to the environment E via the plenum 219 and a blower outlet 214b fluidly connected to the environment E via the air outlet conduit 202 for expelling air that has been heated by the liquid coolant.

In the embodiment shown, the blower 214 is in driving engagement with the shaft 114 (FIG. 2) of the engine 112. However, it is understood that the blower 214 may be electrically, hydraulically, and/or pneumatically driven without departing from the scope of the present disclosure. The blower 214, in use, decreases an air pressure within the engine compartment C thereby creating a suction effect at the louvers 208 that are fluidly connected to the plenum 219. The negative pressure created by the blower 214 within the engine compartment C creates a suction force at the louvers 208 that draws air from the environment E, through the louvers 208, in the plenum 219 located between the air outlet conduit 202 and the wall of the tail cone, through the air inlet C6 defined through the firewall C5 and in the engine compartment C to be circulated in the at least one second conduit 126b of the heat exchanger 126 to pick up heat from the liquid coolant. The air that has been heated via its passage through the heat exchanger is then pushed out of the engine compartment C via the air outlet conduit 202 and exits said conduit to the environment E. Other configurations are contemplated.

Referring to FIGS. 4-5, the blower 214 is located within a conduit 216, also referred to as a swept exhaust duct, having an inlet 216a and an outlet 216b. The inlet 216a of the conduit 216 is fluidly connected to the environment E via the plenum 219 and via the at least one second conduit 126b (FIG. 2) of the heat exchanger 126. The heat exchanger 126 may span the inlet 216a of the conduit 216 such that all the air entering the conduit 216 passes through the heat exchanger 126. The heat exchanger 126 is disposed adjacent the inlet 216a of the conduit 216. In the embodiment shown, the inlet 216a of the conduit 216 is downstream of the heat exchanger 126 relative to a flow of air circulating form the plenum 219 and through the heat exchanger 126. Other configurations are contemplated. For instance, the heat exchanger may be located downstream of the blower 214.

The outlet 216b of the conduit 216 is fluidly connected to the air outlet conduit 202. Stated differently, the outlet 216b of the conduit 216 is fluidly connected to the environment E via the air outlet conduit 202. As shown more clearly in FIG. 4, a portion of the conduit 216 protrudes inside the air outlet conduit 202 such that the outlet 216b of the conduit is downstream of the inlet 202a and upstream of the outlet 202b of the air outlet conduit 202.

As shown more clearly on FIGS. 4-5, a portion of the conduit 216 is swept. That is, a cross-section of the portion of the conduit 216 changes shape from being substantially circular at the outlet 214b of the blower 214 to being crescent-shaped at its outlet 216b. In the embodiment shown, the crescent shape of the outlet 216b of the conduit has a convex side and an opposed concave side; the exhaust conduit 204 being partially surrounded by the concave side of the conduit 216. In other words, the conduit 216, at its outlet 216b, follows a shape of the exhaust conduit 204. Other configurations are contemplated.

In the embodiment shown, the conduit 216 has a top wall 216c and a bottom wall 216d opposed to the top wall 216c; the top and bottom walls 216c, 216d converging toward each other along a direction of air circulating therein. This might create an acceleration of the air circulating in the conduit 216 downstream of the blower 214.

Referring more particularly to FIG. 3, in the depicted embodiment, the heat exchanger 126 has three heat exchanger sections 126' that are circumferentially disposed one next to the other around the blower 214. Stated differently, the three heat exchanger sections 126' are circumferentially disposed around a rotation axis of the blower 214, which, in this case, coincides with the shaft 114 of the internal combustion engine 112. In the embodiment shown, the inlet 216a of the conduit 216 containing the blower 214 extends circumferentially around the blower 214. All of the three heat exchanger sections 126' may be used for cooling the liquid coolant of the internal combustion engine 112. Alternatively, at least one of the three heat exchanger sections 126' may have its at least one first conduit 126a fluidly connected to a lubricant circuit of the engine 112 for transferring heat from the lubricant to the environment E.

Referring now to FIG. 6, the shroud conduit 202 may be used to support the engine exhaust pipe 204. As aforementioned, the shroud conduit 202 defines a gaspath, referred to above as the annulus 206, to eject to the environment E the air that has been used for cooling the liquid coolant (or other fluids) of the internal combustion engine 112. Segmented exhaust supports may be used to locate the exhaust pipe 204 within the shroud conduit 202. Those support may extend radially relative to the longitudinal axis L from the exhaust pipe 204 to the shroud conduit 202 and may be secured to one or both of the exhaust pipe 204 and the shroud conduit 202.

Figure 7:
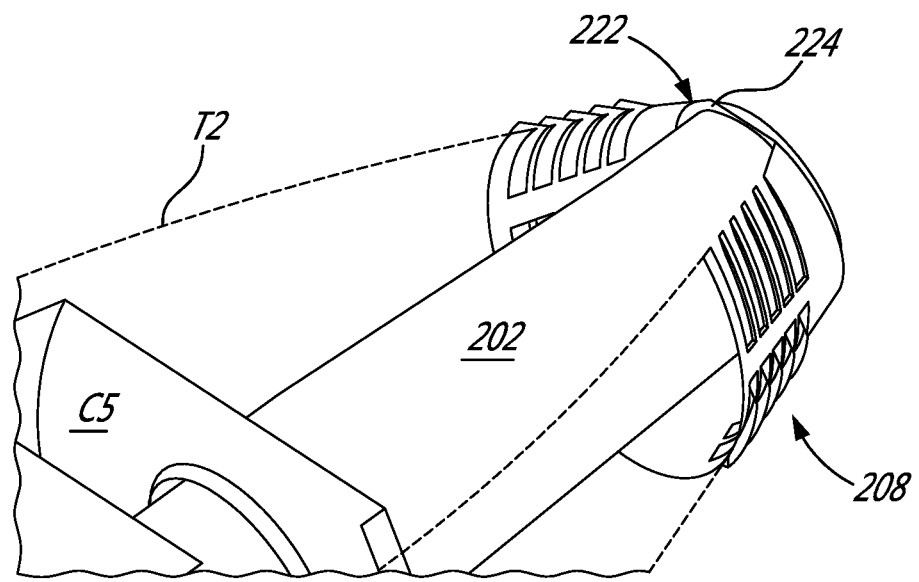
FIG. 7 is a schematic cut-away view of the aircraft power plant of FIG. 3.

Referring now to FIG. 7, a rear frame aft closure 222 extends from the air outlet conduit 202 to the wall T2 of the tail cone T and provides support to the air outlet conduit 202. The rear frame aft closure 222 is provided in the form of an annular wall 224 circumferentially extending all around the longitudinal axis L2 of the air outlet conduit 202 and sealingly receiving there through the air outlet conduit 202. The annular wall 224 extends at least radially relative to the longitudinal axis L from the air outlet conduit 202 to the wall T2 of the tail cone T. The annular wall 224 may provide a sealed interface at a rear of the plenum 219 to prevent air that has been heated via its passage through the heat exchanger 126 form being redirected back to the engine compartment C as this would increase a temperature of the cooling air that comes directly from the environment E. In other words, the annular wall 224 may be in a sealing engagement against both of the air outlet conduit 202 and the wall T2 of the tail cone T.

Referring now to FIG. 10, in the embodiment shown, the louvers 208 are defined by the wall T2 of the tail section T of the aircraft A. The louvers 208 define an air inlet, also referred to as a tail cone inlet, 208a of the engine compartment C. Stated differently, the engine compartment C is fluidly connected to the environment E via the air inlet 208a defined by the louvers 208. The louvers 208 are circumferentially distributed around the tail cone T.

Each of the louvers 208 may extend along a width taken in a circumferential direction relative to the longitudinal axis L of the air outlet conduit 202 and along a length taken in an axial direction relative to the longitudinal axis L; the width being greater than the length.

In the embodiment shown, each of the louvers 208 defines an opening 208b that is oriented away from the apex T1. In the embodiment shown, each of the louvers 208 includes a slat 208c extending at an angle from the wall T2 to an edge 208d of the slat 208c. The opening 208b is defined between the wall T2 to the edge 208d of the slat 208c. The opening 208b may be oriented away from the apex T1. In other words, an axis normal to a plane containing the opening 208b may be oriented away from the apex T1 of the tail cone T.

Alternatively, the louvers 208 may be defined by apertures extending through the wall T2 of the tail cone T of the aircraft A. The louvers 208 may be scoops configured for "scooping" a flow of air proximate the wall T2 of the tail cone T. The louvers 208 may be any suitable inlet features having any suitable shape allowing air to flow from the environment E toward the air outlet conduit 202. The louvers 208 may be openings with protection screens. In the embodiment shown, the air is drawn at the back of the aircraft A through inlet panels incorporating the forward facing louvers 208. Alternatively, the louvers may be defined as forward facing scoop inlets arranged circumferentially around the rear tail cone T external surface. A cooling flow F is directed to the engine compartment C by flowing into the annulus 206 located between the shroud conduit 202 and the engine exhaust duct 204.

In the embodiment shown, the disclosed power plant 200 takes advantage of a favorable static pressure distribution on the tail cone wall T1 in flight that might create a negative pressure differential between the cooling air inlets and discharge locations. This favorable pressure differential might help the cooling fan (e.g., blower 214) performance by creating a "natural flow direction" into the engine compartment C.

Internal combustion engines, such as the engine 112 described herein above, require a large amount of cooling air. In a particular embodiment, the internal combustion engine 112 uses 18 liters of air per second for cooling. In a particular embodiment, the disclosed cooling system 201 is able to cater to such cooling requirements of the engine 112.

For operating the cooling system 201, the rotatable load 115 is driven with the liquid cooled internal combustion aircraft power plant 200; a pressure within the engine compartment C is decreased relative to a pressure in the environment E with the blower 214 to draw cooling air from the environment E into the engine compartment C via the tail cone inlet 208a and through the firewall C5 of the engine compartment C; and the liquid cooled internal combustion aircraft power plant 200 is cooled using the cooling air.

In the embodiment shown, cooling the liquid cooled internal combustion aircraft power plant 200 includes heating the drawn cooling air and expelling the heated drawn cooling air to the environment E via the shroud duct 202 extending from the firewall C5 to the environment E. In the embodiment shown, exhaust gases are expelled to the environment E via the exhaust duct 204 extending within the shroud duct 202. In the depicted embodiment, the exhaust gases are expelled along a direction different than that of the heated drawn cooling air. In the embodiment shown, expelling the heated drawn cooling air includes accelerating the heated drawn cooling air downstream of the blower. Herein, cooling the liquid cooled internal combustion aircraft power plant 200 includes transferring heat from the liquid coolant circulating within the coolant circuitry of the liquid cooled internal combustion aircraft power plant 200 to the drawn cooling air.

Embodiments disclosed herein include:

A. A cooling system for a liquid cooled internal combustion power plant housed in an engine compartment in a tail cone of an aircraft, the cooling system comprising: a tail cone inlet defined through a wall of the tail cone and fluidly communicating with an environment outside the aircraft; a wall inlet defined through a firewall of the engine compartment; a blower within the engine compartment and having a blower inlet and a blower outlet, the blower inlet fluidly communicating with the environment via the tail cone inlet, via the wall inlet, and via an interior of the engine compartment; a blower outlet defined through a wall of the aircraft and fluidly communicating with the environment; and a cooling flow path extending from the tail cone inlet to the air outlet and across the wall inlet, the cooling flow path in heat exchange relationship with the liquid cooled internal combustion power plant.

B. An aircraft power plant configured to be located within an engine compartment of a tail cone of an aircraft, comprising: an intermittent internal combustion engine; a tail cone inlet defined through a wall of the tail cone and fluidly connected to an environment outside the aircraft; a wall inlet defined through a firewall of the engine compartment; a blower within the engine compartment and having a blower inlet and a blower outlet, the blower inlet fluidly connected to the environment via the tail cone inlet, via the wall inlet, and via an interior of the engine compartment; an outlet defined through a wall of the aircraft and fluidly connecting the blower outlet to the environment; and a cooling flow path extending from the tail cone inlet to the air outlet and across the wall inlet, the cooling flow path in heat exchange relationship with the intermittent internal combustion engine.

Embodiments A and B may include any of the following elements in any combinations:

Element 1: a shroud duct fluidly connected to the blower outlet and extending within the tail cone from the firewall to the outlet. Element 2: an exhaust duct is fluidly connected to an exhaust of the liquid cooled internal combustion aircraft power plant and to the environment, the exhaust duct extending within the shroud duct. Element 3: the exhaust duct is angled relative to the shroud duct. Element 4: an air exhaust conduit fluidly connected to the blower and to the shroud duct, the air exhaust conduit having a top wall and a bottom wall opposed to the top wall, the bottom wall converging toward the top wall along a direction of an airflow circulating within the air exhaust conduit. Element 5: a heat exchanger having at least one first conduit fluidly connected to the environment via the tail cone inlet and the wall inlet and at least one second conduit in heat exchange relationship with the at least one first conduit and fluidly connectable to a coolant circuitry of the liquid cooled internal combustion aircraft power plant. Element 6: the blower is located within a blower conduit having a conduit inlet fluidly connected to the environment via the tail cone inlet and a conduit outlet fluidly connected to the environment via the outlet, the heat exchanger disposed upstream of the conduit inlet, the at least one first conduit of the heat exchanger fluidly connected to the conduit inlet. Element 7: a plenum is defined between the wall of the tail cone and the shroud duct, the blower inlet fluidly connected to the environment via the tail cone inlet, the plenum, and the wall inlet defined through the firewall. Element 8: the blower is in driving engagement with a shaft of the liquid cooled internal combustion aircraft power plant. Element 9: an annular wall extending from the shroud duct to the wall of the tail cone, the annular wall in a sealing engagement with the shroud duct and with the wall of the tail cone. Element 10: the air inlet is defined by louvers defined by the wall of the tail cone. Element 11: the louvers define openings facing away from an apex of the tail cone.

C. A method of operating a cooling system for a liquid cooled internal combustion aircraft power plant located within an engine compartment of a tail cone of an aircraft, comprising: driving a rotatable load with the liquid cooled internal combustion aircraft power plant; decreasing a pressure within the engine compartment relative to a pressure in the environment with a blower to draw cooling air from the environment into the engine compartment via a tail cone inlet and through a firewall of the engine compartment; and cooling the liquid cooled internal combustion aircraft power plant using the cooling air.

Embodiment C may include any of the following elements in any combinations:

Element 20: cooling the liquid cooled internal combustion aircraft power plant includes heating the drawn cooling air and expelling the heated drawn cooling air to the environment via a shroud duct extending from the firewall to the environment. Element 21: expelling exhaust gases of the liquid cooled internal combustion aircraft power plant to the environment via an exhaust duct extending within the shroud duct. Element 22: expelling the exhaust gases and expelling the heated drawn cooling air includes expelling the exhaust gases along a direction different than that of the heated drawn cooling air. Element 23: expelling the heated drawn cooling air includes accelerating the heated drawn cooling air downstream of the blower. Element 24: cooling the liquid cooled internal combustion aircraft power plant includes transferring heat from a liquid coolant circulating within a coolant circuitry of the liquid cooled internal combustion aircraft power plant to the drawn cooling air.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A cooling system for a liquid cooled internal combustion power plant housed in an engine compartment in a tail cone of an aircraft, the cooling system comprising: a tail cone inlet defined through a wall of the tail cone and fluidly communicating with an environment outside the aircraft, the tail cone inlet located at an end of the tail cone; a wall inlet defined through a firewall of the engine compartment; a blower within the engine compartment and having a blower inlet and a blower outlet, the blower inlet fluidly communicating with the environment via the tail cone inlet, via the wall inlet, and via an interior of the engine compartment; an outlet defined through a wall of the aircraft and fluidly communicating with the environment, the blower outlet fluidly connected to a shroud duct extending within the tail cone from the firewall to the outlet; a cooling flow path extending from the tail cone inlet to the air outlet and across the wall inlet, the cooling flow path in heat exchange relationship with the liquid cooled internal combustion power plant; and an exhaust duct fluidly connected to an exhaust of the liquid cooled internal combustion aircraft power plant and to the environment, the exhaust duct extending within the shroud duct.

2. The cooling system of claim 1, wherein the exhaust duct is angled relative to the shroud duct.

3. The cooling system of claim 1, further comprising an air exhaust conduit fluidly connected to the blower and to the shroud duct, the air exhaust conduit having a top wall and a bottom wall opposed to the top wall, the bottom wall converging toward the top wall along a direction of an airflow circulating within the air exhaust conduit.

4. The cooling system of claim 1, further comprising a heat exchanger having at least one first conduit fluidly connected to the environment via the tail cone inlet and the wall inlet and at least one second conduit in heat exchange relationship with the at least one first conduit and fluidly connectable to a coolant circuitry of the liquid cooled internal combustion aircraft power plant.

5. The cooling system of claim 4, wherein the blower is located within a blower conduit having a conduit inlet fluidly connected to the environment via the tail cone inlet and a conduit outlet fluidly connected to the environment via the outlet, the heat exchanger disposed upstream of the conduit inlet, the at least one first conduit of the heat exchanger fluidly connected to the conduit inlet.

6. The cooling system of claim 1, wherein a plenum is defined between the wall of the tail cone and the shroud duct, the blower inlet fluidly connected to the environment via the tail cone inlet, the plenum, and the wall inlet defined through the firewall.

7. The cooling system of claim 1, wherein the blower is in driving engagement with a shaft of the liquid cooled internal combustion aircraft power plant.

8. The cooling system of claim 1, further comprising an annular wall extending from the shroud duct to the wall of the tail cone, the annular wall in a sealing engagement with the shroud duct and with the wall of the tail cone.

9. The cooling system of claim 1, wherein the tail cone inlet is defined by louvers defined by the wall of the tail cone.

10. The cooling system of claim 9, wherein the louvers define openings facing away from an apex of the tail cone.

11. A method of operating a cooling system for a liquid cooled internal combustion aircraft power plant located within an engine compartment of a tail cone of an aircraft, comprising: driving a rotatable load with the liquid cooled internal combustion aircraft power plant and expelling exhaust gases of the liquid cooled internal combustion aircraft power plant to the environment via an exhaust duct; decreasing a pressure within the engine compartment relative to a pressure in the environment with a blower to draw cooling air from the environment into the engine compartment via a tail cone inlet and through a firewall of the engine compartment, the tail cone inlet located at an end of the tail cone; and cooling the liquid cooled internal combustion aircraft power plant using the cooling air by heating the drawn cooling air and expelling the heated drawn cooling air to the environment via a shroud duct extending from the firewall to the environment and disposed around the exhaust duct.

12. The method of claim 11, wherein expelling the exhaust gases and expelling the heated drawn cooling air includes expelling the exhaust gases along a direction different than that of the heated drawn cooling air.

13. The method of claim 11, wherein expelling the heated drawn cooling air includes accelerating the heated drawn cooling air downstream of the blower.

14. The method of claim 11, wherein cooling the liquid cooled internal combustion aircraft power plant includes transferring heat from a liquid coolant circulating within a coolant circuitry of the liquid cooled internal combustion aircraft power plant to the drawn cooling air.

15. An aircraft power plant configured to be located within an engine compartment of a tail cone of an aircraft, comprising: an intermittent internal combustion engine; a tail cone inlet defined through a wall of the tail cone at an end of the tail cone and fluidly connected to an environment outside the aircraft; a wall inlet defined through a firewall of the engine compartment; a blower within the engine compartment and having a blower inlet and a blower outlet, the blower inlet fluidly connected to the environment via the tail cone inlet, via the wall inlet, and via an interior of the engine compartment; an outlet defined through a wall of the aircraft, the blower outlet fluidly connected to environment via a shroud duct extending within the tail cone from the firewall to the outlet; a cooling flow path extending from the tail cone inlet to the air outlet and across the wall inlet, the cooling flow path in heat exchange relationship with the intermittent internal combustion engine; and an exhaust duct fluidly connecting an exhaust of the liquid cooled internal combustion aircraft power plant to the environment, the shroud duct extending around the exhaust duct.

* * * * *